US008044640B2

(12) United States Patent
Cruise et al.

(10) Patent No.: US 8,044,640 B2
(45) Date of Patent: Oct. 25, 2011

(54) METHOD FOR STEPPING CURRENT OUTPUT BY A BATTERY CHARGER

(75) Inventors: Nathan Cruise, Phoenix, MD (US); Brian K. Wohltmann, Rosedale, MD (US)

(73) Assignee: Black & Decker Inc., Newark, DE (US)

( * ) Notice: Subject to any disclaimer, the term of this patent is extended or adjusted under 35 U.S.C. 154(b) by 593 days.

(21) Appl. No.: 12/246,890

(22) Filed: Oct. 7, 2008

(65) Prior Publication Data
US 2010/0085021 A1    Apr. 8, 2010

(51) Int. Cl.
*H20J 7/04* (2006.01)
*H20J 7/00* (2006.01)

(52) U.S. Cl. .......................... 320/162; 320/137
(58) Field of Classification Search .......... None
See application file for complete search history.

(56) References Cited

U.S. PATENT DOCUMENTS

| | | | |
|---|---|---|---|
| 3,864,617 A * | 2/1975 | Smith et al. | 320/159 |
| 5,194,802 A | 3/1993 | Hill et al. | |
| 5,541,490 A * | 7/1996 | Sengupta et al. | 320/160 |
| 5,625,275 A * | 4/1997 | Tanikawa et al. | 320/160 |
| 6,194,873 B1 | 2/2001 | Matsushita | |
| 6,331,763 B1 | 12/2001 | Thomas et al. | |
| 6,518,731 B2 | 2/2003 | Thomas et al. | |
| 6,586,917 B1 | 7/2003 | Smith | |
| 6,828,764 B2 | 12/2004 | Takimoto et al. | |
| 6,833,685 B2 * | 12/2004 | Howard et al. | 320/128 |
| 6,836,095 B2 | 12/2004 | Fogg | |
| 6,859,016 B2 | 2/2005 | Dotzler | |
| 6,943,529 B2 | 9/2005 | Cheiky et al. | |
| 7,218,076 B2 | 5/2007 | Cheiky et al. | |
| 7,272,025 B2 | 9/2007 | Hawley | |
| 2003/0057920 A1 | 3/2003 | Dotzler | |
| 2003/0111979 A1 | 6/2003 | Cheiky et al. | |
| 2004/0178772 A1 | 9/2004 | Cheiky et al. | |
| 2006/0033472 A1 | 2/2006 | Wang | |
| 2006/0103354 A1 | 5/2006 | Gubbins | |
| 2006/0113963 A1 | 6/2006 | Wang et al. | |
| 2007/0188139 A1 | 8/2007 | Hussain et al. | |
| 2007/0210756 A1 | 9/2007 | Choi et al. | |

FOREIGN PATENT DOCUMENTS

| | | |
|---|---|---|
| DE | 33 21 045 | 12/1983 |
| DE | 35 26 045 | 1/1987 |
| EP | 0 216 662 | 8/1986 |
| EP | 0 522 691 | 5/1992 |
| WO | WO 95/17022 | 6/1995 |

* cited by examiner

*Primary Examiner* — Vinh Nguyen
(74) *Attorney, Agent, or Firm* — Harness, Dickey & Pierce, P.L.C.

(57) ABSTRACT

A battery charger is provided for implementing a charging method having a stepped output current. The battery charger includes: a power supply circuit that receives an AC input signal and outputs a DC output signal. The power supply circuit includes a power supply controller configured to receive a feedback signal indicative of current being output by the power supply circuit via an amplifier and operates to control current output by the power supply circuit in accordance with the feedback signal. A charger controller is interfaced with the power supply controller to implement a charging method having a stepped output current. The charger controller may set the output current level by adjusting gain of an operational amplifier having a negative feedback configuration with the feedback signal input to a non-inverting input terminal of the operational amplifier, where the charger controller sets the output current level by changing the resistance at an inverting input terminal of the operational amplifier.

19 Claims, 4 Drawing Sheets

METHOD FOR STEPPING CURRENT OUTPUT BY A BATTERY CHARGER

FIELD

The present disclosure relates to a battery charger and more particularly to a method for stepping current output by a battery charger.

BACKGROUND

Over the past few years, lithium-ion batteries have begun replacing nickel-cadmium (NiCd), nickel-metal-hydride (NiMH), and lead-acid batteries in portable electronic devices such as personal computers as well as in portable power tools. As compared to these more conventional battery types, lithium-ion batteries typically employ more sophisticated charging schemes having stepped output current. For example, a battery charger may apply a pre-charge current having a lower amperage value to a battery pack before delivering a larger amperage current to the battery pack. Therefore, it is desirable for battery chargers to employ power supply circuits that can effectively deliver output current at different amperage values to a battery pack.

This section provides background information related to the present disclosure which is not necessarily prior art.

SUMMARY

A battery charger is provided for implementing a charging method having a stepped output current. The battery charger includes: a power supply circuit that receives an AC input signal and outputs a DC output signal. The power supply circuit includes a power supply controller configured to receive a feedback signal indicative of current being output by the power supply circuit via an amplifier and operates to control current output by the power supply circuit in accordance with the feedback signal. A charger controller is interfaced with the power supply controller to implement a charging method having a stepped output current.

In one aspect of the disclosure, the charger controller sets the output current level by adjusting gain of an operational amplifier having a negative feedback configuration with the feedback signal input to a non-inverting input terminal of the operational amplifier, where the charger controller sets the output current level by changing the resistance at an inverting input terminal of the operational amplifier.

This section provides a general summary of the disclosure, and is not a comprehensive disclosure of its full scope or all of its features. Further areas of applicability will become apparent from the description provided herein. The description and specific examples in this summary are intended for purposes of illustration only and are not intended to limit the scope of the present disclosure.

DRAWINGS

Figure 1:
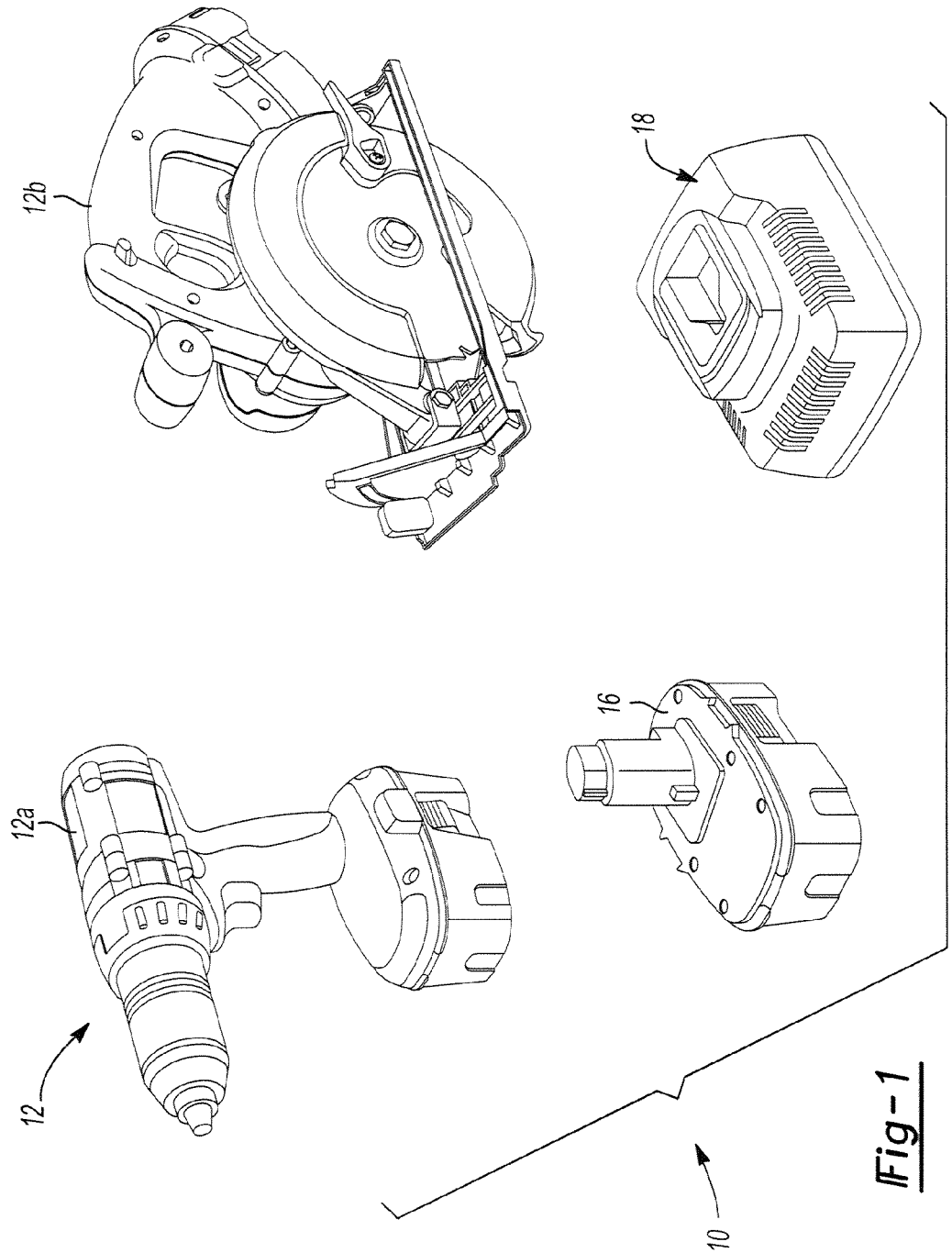
FIG. 1 is a diagram of an exemplary system of power tools.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

The present disclosure can relate to a system of power tools of the type that is generally indicated by reference numeral 10 in FIG. 1. The system of power tools 10 can include, for example, one or more power tools 12, a battery pack 16 and a battery pack charger 18. Each of the power tools 12 can be any type of power tool, including without limitation drills, drill/drivers, hammer drill/drivers, rotary hammers, screwdrivers, impact drivers, circular saws, jig saws, reciprocating saws, band saws, cut-off tools, cut-out tools, shears, sanders, vacuums, lights, routers, adhesive dispensers, concrete vibrators, lasers, staplers and nailers. In the particular example provided, the system of power tools 10 includes a first power tool 12a and a second power tool 12b. For example, the first power tool 12a can be a drill/driver similar to that which is described in U.S. Pat. No. 6,431,289, while the second power tool 12b can be a circular saw similar to that which is described in U.S. Pat. No. 6,996,909. The battery pack 16 can be selectively removably coupled to the first and second power tools 12a and 12b to provide electrical power thereto. The battery pack 16 can also be selectively electrically coupled to the battery pack charger 18 to charge the battery pack 16. It is noteworthy that the broader aspects of this disclosure are applicable to other types of battery powered devices.

Figure 2:
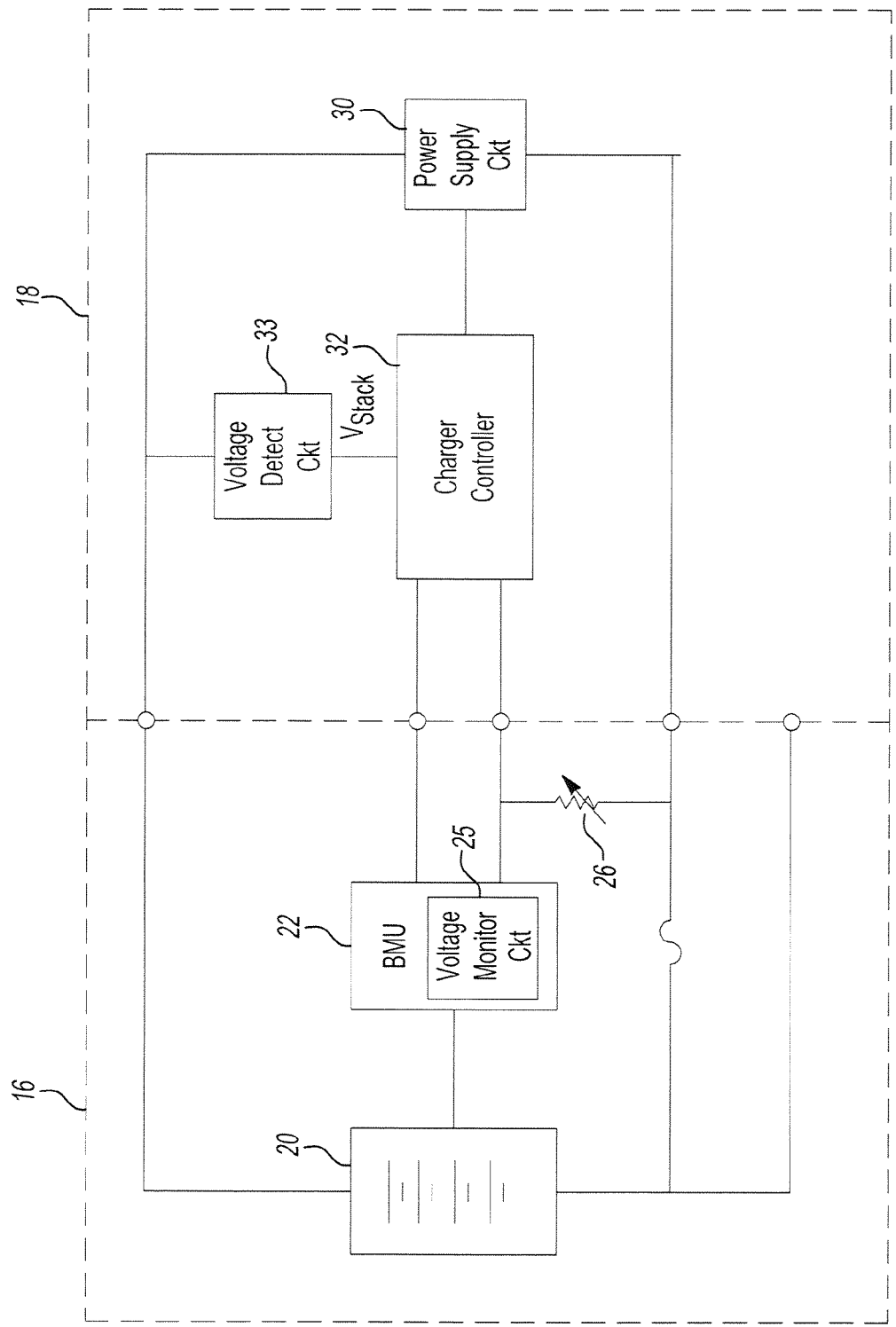
FIG. 2 is a block diagram of an exemplary configuration for a battery pack operably coupled to battery charger.

FIG. 2 illustrates an exemplary configuration of a battery pack 16 operably coupled to a battery charger 18. The battery pack 16 is generally comprised on a plurality of battery cells 20, a battery control unit 22 and various battery control circuits. This exemplary configuration is merely provided as a context for describing the various charging methods and circuits disclosed herein. Moreover, the configuration may represent only a portion of the internal circuitry. The battery pack and/or the battery charger may include additional functionality or components such as pack identification components, other protection circuits and/or other internal components which are not shown herein for reasons for clarity.

The plurality of battery cells 20 are preferably connected in series. In an exemplary embodiment, the battery cells have lithium-ion chemistry. Battery cells having other lithium-based chemistries, such as lithium metal or lithium polymer, as well as other types of chemistries, such as nickel cadmium (NiCd), nickel metal hydride (NiMH) and lead-acid, are also contemplated by this disclosure.

The battery control unit 22 embedded within the battery pack 16 is responsible for protecting the battery cells and monitoring any fault conditions which may develop. The battery control unit 22 may be implemented in software (i.e., computer executable instructions) on a digital microcontroller. Alternatively, the battery control unit 22 may be implemented in hardware using analog circuitry. One exemplary battery management unit is the OZ8800 integrated circuit commercially available from $O_2$Micro of Santa Clara, Calif.

To monitor cell voltages, the battery control unit 22 relies upon a voltage monitoring circuit that may be integrated therein or external thereto. The voltage monitoring circuit 25 is typically configured to sense individual cell voltages as well as sense total pack voltage. The individual cell or stack voltages are in turn made available by the voltage monitoring circuit to the battery control unit 22. An exemplary external voltage monitoring circuit is further described in U.S. patent application Ser. No. 12/170,718 filed on Jul. 10, 2008 and which is hereby incorporated by reference.

In an exemplary embodiment, the battery pack is configured with five terminals: B+ terminal is connected directly to the anode of the most positive battery cell; CHG– terminal provides the main charging current path between the battery charger and the battery cells; and DSCHG– terminal provides the main discharge current path between a tool and the battery cells. Remaining two terminals are used for data communications sent between the battery pack and the battery charger. It is readily understood that other terminal arrangements are suitable for the battery pack.

A temperature sensor 26 may be configured to measure the temperature of the battery cells. The temperature sensor in turn communicates a measured temperature to the battery control unit 22. The temperature sensor may be implemented with a negative temperature coefficient (NTC) thermistor, as shown, a positive temperature coefficient (PTC) thermistor, temperature sensing integrated circuits, or thermocouples by way of non-limiting example.

The battery pack 16 is selectively coupled to a battery pack charger 18. The battery pack charger 18 is generally comprised of a power supply circuit 30 and a charger control unit 32. The battery pack charger 18 may also include a pack voltage detection circuit 33. It is understood that other sensing and/or protections circuits may also be incorporated in the battery charger. This exemplary configuration is merely provided as a context for describing the various charging methods and circuits disclosed herein.

Figure 3:
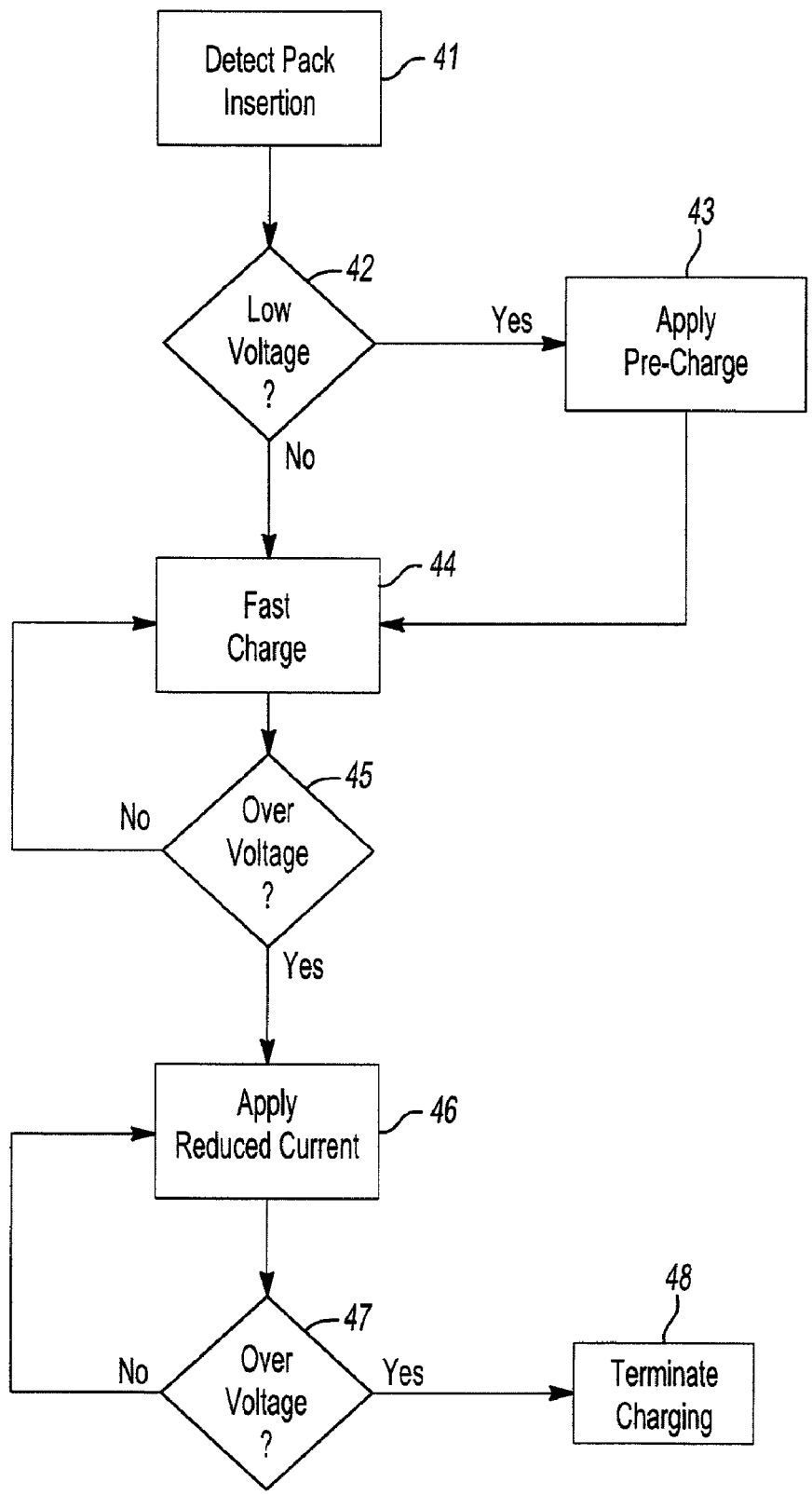
FIG. 3 is a flow diagram of an exemplary charging method having a stepped output current.

With reference to FIG. 3, the charger control unit 32 is responsible for charging the battery cells and monitoring any fault conditions which may develop. In an exemplary embodiment, the charger control unit 32 implements a charging method having a stepped output current. To begin a charging operation, the battery pack 16 is inserted into the charger 18. Select terminals on the battery pack will engage with associated terminals on the charger 18. When the battery pack is inserted into charger, the charger control unit 32 is able to detect the insertion at 41 and initiate a charging algorithm. Various techniques for detecting the presence of the battery pack may be employed by the battery charger.

The charger control unit 32 first ascertains the cell voltages in the battery pack. The charger control unit 32 may monitor individual cell voltages and/or the total pack voltage of the battery pack. In an exemplary embodiment, voltage measurements are passed periodically from the battery control unit in the battery pack via one or more data links to the charger control module in the battery charger. In this case, the charger control module may have access to individual cell voltages. In an alternative embodiment, the battery control unit provides the charger control module with a low-voltage indicator when one of the cell voltages is below a low-voltage threshold or an over-voltage indicator when one of the cell voltages is above an over-voltage threshold. Other techniques for monitoring cell voltages are contemplated by this disclosure.

When at least one of the cell voltages is below a low-voltage threshold, a pre-charge current is delivered at 43 by the battery charger to the battery pack. The pre-charge current is set to a level (e.g., 100 mA) that is substantially less than the typical charging current. The low-voltage threshold value is dependent upon cell chemistry and can be 2.7 volts, by way of non-limiting example. A pre-charging current may be used to determine if a short is present in one of the battery cells. The charger control unit 32 will monitor the rate at which cell voltage or pack voltage increases. If the voltage does not increase at a predetermine rate, the battery pack may be deemed unsafe for further charging and thus charging is terminated. Conversely, if the voltage does increase in a satisfactory manner, then the battery control module may initiate fasting charging. Likewise, when none of the cell voltages are found to be below the low-voltage threshold, pre-charging step may be skipped and the battery control module may proceed directly to fast charging at 44.

During fast charging, the current output by the battery charger is stepped up to a nominal level (e.g., 2 A). The battery charger will continue delivering a constant current to the battery pack until one or more of the battery cells reaches a target threshold (e.g., 4.1 V). Upon reaching the target threshold, charging is suspended. The charger control module continues to monitor battery pack voltages. If cell voltages fall below the target threshold, the charge control module will re-initiate charging at 46. In an exemplary embodiment, current delivered by the battery charger is set to a lower level (e.g., 1 A) than the nominal current level. This process may be repeated for a determined number of iterations or until the cell voltages remain at the target threshold levels. At each iteration, the current level may be further reduced (e.g., by 50%). The charging process is then terminated at 48 until the battery pack is removed from the charger. Other types of charging schemes having stepped output current are also within the broader aspects of this disclosure.

Although not limited thereto, it is envisioned that the charging scheme described above may cooperatively function with a cell balancing method. In one exemplary embodiment, the cell balancing method compares the cell voltage for each cell to a target charge value. If the cell voltage for a given cell exceeds the target charge value, then the charge current is diverted around the given cell. Current may be diverted by a cell monitoring arrangement in the manner described in U.S. patent application Ser. No. 12/170,718 filed on Jul. 10, 2008 which is incorporated herein by reference. The cell balancing scheme is preferably implemented by the battery control unit. This cell balancing method, in conjunction with the charging scheme, causes the charge current to match the current required by the balancing circuit so that a net current received by the cells having reached the target charging value is substantially zero.

To implement either the charging scheme or the cell balancing scheme, cell voltages measurements and commands are passed cooperatively between the battery control unit 22 and the charger control unit 32. It is to be understood that only the relevant steps of these schemes are discussed above, but that other software-implemented instructions may be needed to control and manage the overall operation of the system.

Figure 4:
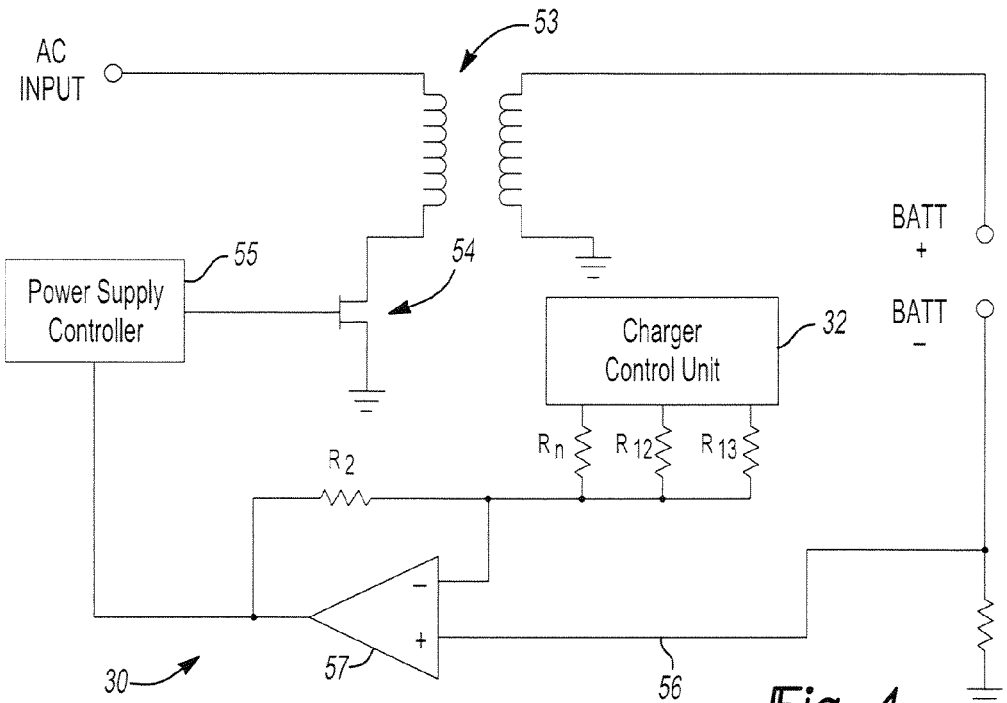
FIG. 4 is a partial schematic of an exemplary power supply circuit which may be employed in a battery charger.

FIG. 4 is a partial schematic of an exemplary switched mode power supply circuit 30 which may be employed by the battery charger. The power supply circuit 30 receives an AC input voltage. The AC input voltage is converted to a high voltage direct current with a diode rectifier and capacitor (not shown). The high voltage DC is then applied to a transformer 53 to transform the voltage to a lower voltage more suitable for charging the battery pack. A power switch 54 controls the current flow through the primary winding of the transformer 53. When the power switch 54 is turned on, current flow through the primary winding. When the power switch 54 is turned off, current does not flow through the primary winding and energy stored in the primary winding is output to the secondary winding. The output from the secondary winding of the transformer 53 is rectified to provide a regulated DC output. A power supply controller 55 coupled to a gate of the power switch 54 controls the switch timing and thereby regulates the output of the power supply circuit.

The power supply controller 55 accounts for many factors to regulate the power supply output. Of note, the power supply controller 55 operates to deliver a steady state current to the battery pack. To do so, the power supply controller is configured to receive a feedback signal indicative of current being output by the power supply circuit. A shunt coupled proximate to the CHG− terminal provides the feedback signal to the power supply controller. The power supply controller in turn controls the power switch and thus regulates the output current in accordance with the feedback signal.

An amplifier is disposed in the feedback path between the CHG− terminal and the power supply controller. In an exemplary embodiment, the amplifier is an operational amplifier having a negative feedback configuration with the feedback signal input to a non-inverting input terminal of the operational amplifier. Gain for an operational amplifier in this configuration is readily understood to be where $R_1$ is the resistance coupled between the inverting input terminal and ground and $R_2$ is the resistance coupled between the inverting input terminal and the output of the amplifier. By changing the resistance at the inverting input terminal of the operational amplifier, the charger controller 32 controls the gain of the operational amplifier and can thereby set the output current level.

In the exemplary embodiment, two or more resistors $R_{11}$, $R_{12}$, $R_{13}$ are connected between the inverting input terminal of the operational amplifier and the charger controller. The resistors are arranged in parallel with each other. The charger controller selectively couples one or more of the resistors to the inverting input terminal, thereby changing resistance at the inverting input terminal of the operational amplifier.

With continued reference to FIG. 4, the resistors are coupled directly to the pins of the charger controller. By pulling a given pin to ground, the charger controller 32 includes the resistor coupled to that given pin in the resistance value $R_1$ and impacts the amplifier gain. Conversely, the charge controller 32 can set a given pin to a high impedance, thereby excluding the resistor coupled to that given pin from the resistance value $R_1$. In this way, the charge controller controls the gain of the amplifier by selectively coupling different resistors to the amplifier.

Figure 5:
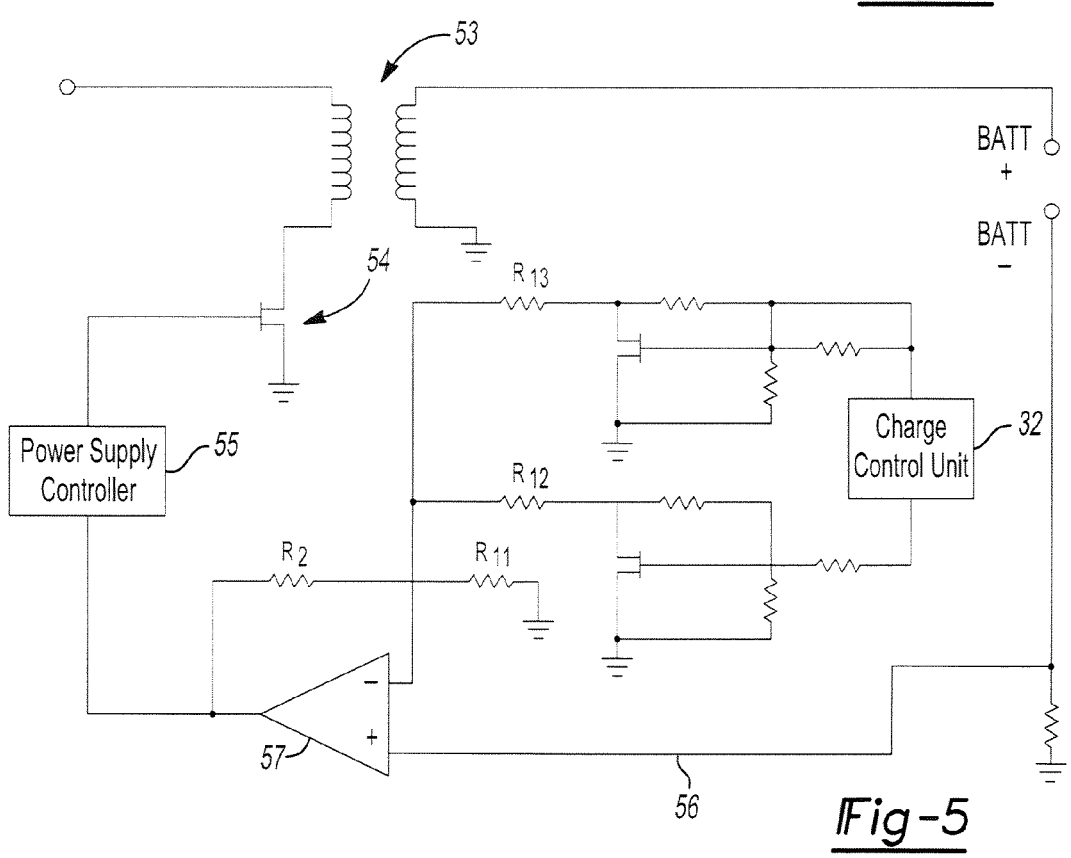
FIG. 5 is a partial schematic of an alternative powers supply circuit which may be employed in a battery charger.

In an alternative embodiment, switches S1, S2 are connected between the charger controller 32 and the resistors $R_{12}$, $R_{13}$, coupled to the amplifier 57 as shown in FIG. 5. Each switch controls one of the resistors. By turning on or off a given switch, the corresponding resistor is included or excluded, respectively, from the resistance value $R_1$. Other techniques for changing the resistance at the inverting input terminal of the operational amplifier or the gain of the amplifier are contemplated by this disclosure.

For illustration purposes, two resistors may be arranged in parallel and connected to the inverting input terminal of the operational amplifier. The two resistors may be combined in different ways to achieve three different current levels as set forth below.

| R1 | R2 | Output Current |
|---|---|---|
| In | Out | 2A |
| In | In | 1A |
| Out | In | 100 mA |

It is readily understood that the resistance values may be selected to achieve particular gains and thus particular current levels. Likewise, the number of resistors arranged in parallel can be varied to achieve more or less current levels.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A battery charger, comprising:
   a power supply circuit receiving an AC input signal and operable to output a DC output signal;
   a power supply controller configured to receive a feedback signal indicative of current being output by the power supply circuit via an amplifier and operable to control current output by the power supply circuit in accordance with the feedback signal; and
   a charger controller interfaced with the power supply controller and the amplifier to implement a charging method having a stepped output current, where charger controller sets level of the output current by adjusting gain of the amplifier.

2. The battery charger of claim 1 wherein the power supply circuit includes a transformer and a power switch coupled to a primary winding of the transformer and the power supply controller is connected to the power switch to control the current flow through the transformer and thereby control the output current of the power supply circuit.

3. The battery charger of claim 1 wherein the amplifier is further defined as an operational amplifier having a negative feedback configuration with the feedback signal input to a non-inverting input terminal of the operational amplifier and the charger controller sets the output current level by changing the resistance at an inverting input terminal of the operational amplifier.

4. The battery charger of claim 3 further comprises two or more resistors arranged in parallel with each other and each of said resistors connected between the inverting input terminal of the operational amplifier and the charger controller.

5. The battery charger of claim 4 wherein the charger controller selectively couples one or more of the resistors to the inverting input terminal, thereby changing resistance at the inverting input terminal of the operational amplifier.

6. The battery charger of claim 4 wherein each of the resistors are coupled between a different pin of the charger controller and the inverting input terminal of the operational amplifier.

7. The battery charger of claim 6 wherein a switch is interposed between each of the resistors and the correspond pin of the charger controller.

8. The battery charger of claim 1 wherein the charger controller is adapted to receive an indicator of voltage of a battery coupled to the battery charger.

9. The battery charger of claim 8 wherein the charger controller sets the output current to a first level when the battery voltage is below a pre-charge threshold and sets the output current to a second level when the battery voltage exceeds the pre-charge threshold, where the first level is less than the second level.

10. The battery charger of claim 8 wherein the charger controller sets the level of the output current to a second level and resets the level of the output to a third level that is less than the second level after the battery voltage exceeds a target threshold.

11. The battery charger of claim 8 wherein the charger controller sets the output current to a first level when the battery voltage is below a pre-charge threshold and sets the output current to a second level when the battery voltage exceeds the pre-charge threshold, where the first level is less than the second level.

12. The battery charger of claim 8 wherein the charger controller sets the level of the output current to a second level and resets the level of the output to a third level that is less than the second level after the battery voltage exceeds a target threshold.

13. The battery charger of claim 1 wherein the feedback signal is input to a non-inverting input terminal of the operational amplifier and the charger controller sets the output current level by changing the resistance at an inverting input terminal of the operational amplifier.

14. The battery charger of claim 1 wherein the charger controller is adapted to receive an indicator of voltage of a battery coupled to the battery charger.

15. A battery charger
a power supply circuit receiving an AC input signal and operable to output a DC output signal, the power supply circuit having a transformer and a power switch coupled to a primary winding of the transformer to control the current flow through the transformer;
a power supply controller configured to receive a feedback signal indicative of current being output by the power supply circuit via an operational amplifier having a negative feedback configuration, the power supply controller coupled to the power switch and operable to control the power switch in accordance with the feedback signal; and
a charger controller interfaced with the power supply controller to implement a charging method having a stepped output current, where charger controller sets level of the output current by changing resistance at an inverting input terminal of the operational amplifier.

16. The battery charger of claim 13 further comprises two or more resistors arranged in parallel with each other and each of said resistors connected between the inverting input terminal of the operational amplifier and the charger controller.

17. The battery charger of claim 16 wherein the charger controller selectively couples one or more of the resistors to the inverting input terminal, thereby changing resistance at the inverting input terminal of the operational amplifier.

18. The battery charger of claim 17 wherein each of the resistors are coupled between a different pin of the charger controller and the inverting input terminal of the operational amplifier.

19. The battery charger of claim 18 wherein a switch is interposed between each of the resistors and the correspond pin of the charger controller.

* * * * *